US012726944B2

(12) United States Patent
Liu et al.

(10) Patent No.: US 12,726,944 B2
(45) Date of Patent: Sep. 1, 2026

(54) PAGING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yang Liu, Dongguan (CN); Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 566 days.

(21) Appl. No.: 18/331,344

(22) Filed: Jun. 8, 2023

(65) Prior Publication Data

US 2023/0319783 A1 Oct. 5, 2023

Related U.S. Application Data

(63) Continuation of application No. PCT/CN2020/136982, filed on Dec. 16, 2020.

(51) Int. Cl.

| | |
|---|---|
| ***H04W 68/02*** | (2009.01) |
| ***H04W 48/18*** | (2009.01) |
| ***H04W 72/23*** | (2023.01) |
| *H04W 74/0833* | (2024.01) |

(52) U.S. Cl.

CPC ........... *H04W 68/02* (2013.01); *H04W 48/18* (2013.01); *H04W 72/23* (2023.01); *H04W 74/0833* (2013.01)

(58) Field of Classification Search

CPC ..... H04W 68/02; H04W 48/18; H04W 72/23; H04W 74/0833; H04W 68/005; H04W 76/27

See application file for complete search history.

(56) References Cited

U.S. PATENT DOCUMENTS

| | | | | |
|---|---|---|---|---|
| 10,560,919 B2 | 2/2020 | Ryu et al. | | |
| 2018/0263012 A1* | 9/2018 | Ryu | H04W 68/02 | |
| 2021/0144674 A1* | 5/2021 | Zhang | H04W 72/23 | |
| 2021/0352531 A1* | 11/2021 | Vesely | H04W 76/19 | |
| 2022/0303884 A1* | 9/2022 | Chen | H04W 76/00 | |
| 2023/0156583 A1* | 5/2023 | Murray | H04W 48/20 | 370/329 |

(Continued)

FOREIGN PATENT DOCUMENTS

| | | |
|---|---|---|
| CN | 106993329 | 7/2017 |
| CN | 107005820 | 8/2017 |
| CN | 108307407 | 7/2018 |

(Continued)

OTHER PUBLICATIONS

NTT Docomo, Inc., "Status Report to TSG," 3GPP TSG RAN meeting #81, RP-181723, Sep. 2018.

(Continued)

*Primary Examiner* — Marcus Hammonds

(74) *Attorney, Agent, or Firm* — Hodgson Russ LLP

(57) ABSTRACT

A paging method is provided. The paging method includes that a terminal device receives, via a first paging-radio network temporary identifier (P-RNTI), downlink control information (DCI) transmitted by a network device, and acquires paging information. The first P-RNTI corresponds to at least one network slice.

17 Claims, 5 Drawing Sheets

(56) References Cited

U.S. PATENT DOCUMENTS

2023/0209464 A1* 6/2023 Tsai .................. H04W 52/0216
370/311

FOREIGN PATENT DOCUMENTS

| | | |
|---|---|---|
| CN | 109691194 | 4/2019 |
| CN | 110167153 | 8/2019 |
| CN | 110999437 | 4/2020 |
| CN | 111108785 | 5/2020 |
| CN | 111200442 | 5/2020 |
| CN | 111670598 | 9/2020 |
| CN | 111901085 | 11/2020 |
| EP | 3512272 | 7/2019 |
| WO | 2017125025 | 7/2017 |
| WO | 2017135856 | 8/2017 |
| WO | 2019006807 | 1/2019 |
| WO | 2019140629 | 7/2019 |

OTHER PUBLICATIONS

CNIPA, First Office Action for CN Application No. 202080107723.5, Jul. 26, 2024.

CNIPA, Second Office Action for CN Application No. 202080107723.5, Oct. 31, 2024.

"3rd Generation Partnership Project; Technical Specification Group Radio Access Network; NR; Medium Access Control (MAC) protocol specification (Release 15)," 3GPP TS 38.321, Dec. 2017, v2.0.0.

CNIPA, Rejection Decision for CN Application No. 202080107723.5, Dec. 24, 2024.

"3rd Generation Partnership Project; Technical Specification Group Radio Access Network; NR; Radio Resource Control (RRC) protocol specification (Release 16)," 3GPP TS 38.331, Jul. 2020, v16.1.0.

WIPO, International Search Report and Written Opinion for International Application No. PCT/CN2020/136982, Sep. 23, 2021.

* cited by examiner

PAGING METHOD, TERMINAL DEVICE, AND NETWORK DEVICE

CROSS-REFERENCE TO RELATED APPLICATION(S)

This application is a continuation of International Application No. PCT/CN2020/136982, filed Dec. 16, 2020, the entire disclosure of which is incorporated herein by reference.

TECHNICAL FIELD

This disclosure relates to the field of communication technology, and particularly to a paging method, a terminal device, and a network device.

BACKGROUND

At present, when terminal devices receive a paging message, the terminal device cannot know a slice type for downlink data, so that the terminal device cannot access a suitable cell or cannot select a suitable access resource, which results in that the terminal device is camped on a cell that cannot satisfy slice services required by the terminal device.

SUMMARY

Implementations of the present disclosure provides a paging method, a terminal device, and a network device.

In a first aspect, a paging method is provided. The paging method includes receiving via a first paging-radio network temporary identifier (P-RNTI), by a terminal device, downlink control information (DCI) transmitted by a network device, and acquiring, by the terminal device, paging information, where the first P-RNTI corresponds to at least one network slice.

In a second aspect, a terminal device is provided. The terminal device includes a receiver configured to receive, via a first P-RNTI, DCI transmitted by a network device, and acquire paging information, where the first P-RNTI corresponds to at least one network slice.

In a third aspect, a network device is provided. The network device includes a transmitter configured to transmit DCI scrambled by a first P-RNTI to a terminal device, where the first P-RNTI corresponds to at least one network slice.

DETAILED DESCRIPTION

Figure 1:
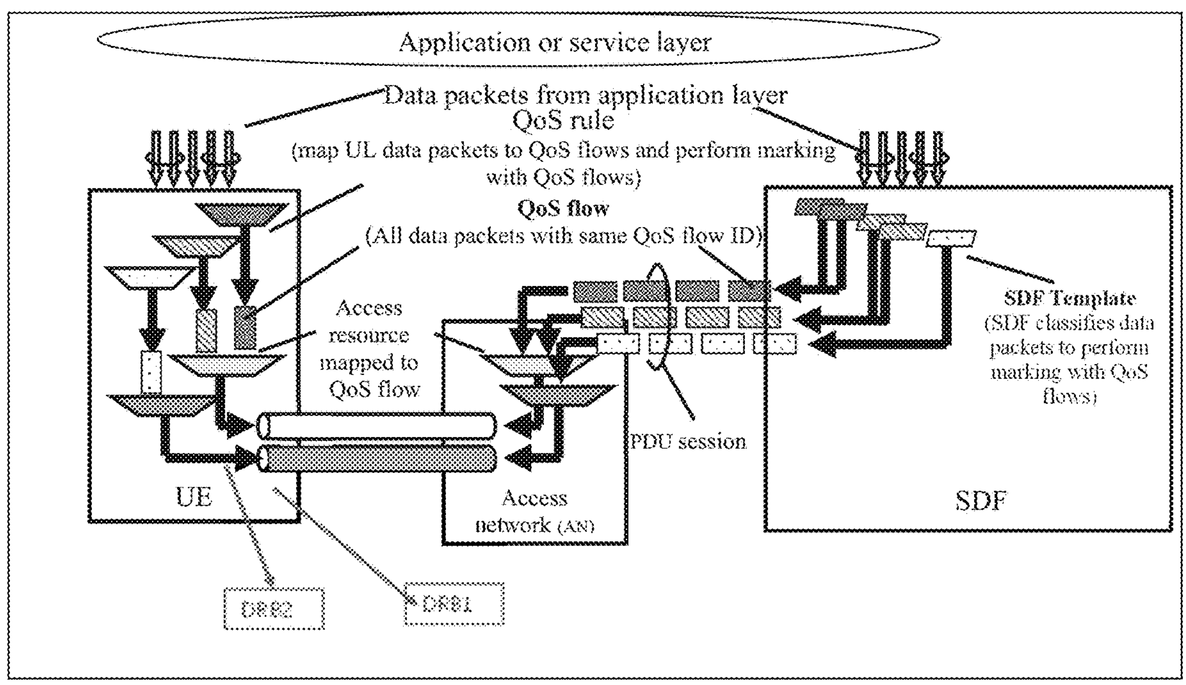
FIG. 1 is a schematic diagram illustrating data-packet transmission provided by implementations of the present disclosure.

The technical solutions in implementations of the present disclosure will be described below with reference to the accompanying drawings in the implementations of the present disclosure. Obviously, the described implementations are only some of rather than all the implementations of the present disclosure. Based on the implementations of the present disclosure, all other implementations obtained by those skilled in the art without creative efforts fall within the protection scope of the present disclosure.

In the implementations of the present disclosure, terms such as "exemplary", "such as", or "for example" are used as examples or illustrations. Any implementation or design solutions described as "exemplary", "such as", or "for example" in the implementations of the present disclosure shall not be construed as being more preferred or more advantageous than other implementations or design solutions. Rather, the use of terms such as "exemplary", "such as", or "for example" is intended to present related concepts in a concrete manner.

The term "and/or" in the specification describes merely an association relationship of associated objects, which means that there may be three relationships, for example, A and/or B may mean that A exists alone, A and B both exist, and B exists alone. The symbol "P" in the specification indicates that associated objects are in an "or" relationship, for example, A/B indicates A or B.

The related technologies and some terms involved in the implementations of the present disclosure are briefly described below.

Section I: A Procedure of Paging a Terminal Device (i.e., User Equipment (UE)) and Information in Paging Information.

When a network device needs to transmit downlink (DL) data for a service to UE in a radio resource control (RRC) idle state (RRC_idle) or RRC inactive state (RRC_inactive state), the network device first needs to transmit a paging message to the UE, so that the UE knows that the network device requests the UE to enter a connected state, to use a cell radio network temporary identifier (C-RNTI) to monitor data on a physical downlink shared channel (PDSCH) scheduled by a physical downlink control channel (PDCCH). The paging message is transmitted to the UE in a paging occasion (PO) of a paging frame (PF) in a wake-up stage in a discontinuous reception (DRX) cycle.

A DRX cycle includes several PFs, each PF includes several POs, and the UE only needs to receive a paging message in a certain PO. i_s represents the number of a PO of a PF for the UE, indicating that the UE will receive a paging message in the $i\_s+1^{th}$ PO of the PF. In a fixed PO, there may be multiple UEs that will perform paging-message sensing.

A calculation formula of a PF is represented by the following formula 1, and a calculation formula of i_s is represented by the following formula 2.

$$PF=(SFN+PF\_offset) \bmod T=(T \text{ div } N)*(UE\_ID \bmod N) \quad \text{Formula 1:}$$

$$i\_s=\text{floor}(UE\_ID/N) \bmod Ns \quad \text{Formula 2:}$$

Parameters in the above formulations are illustrated as follows.

T: DRX cycle;

System information contains a cell-level indicator Tc, and RRC may contain a UE-level indicator T_UE, if T_UE is not indicated in RRC, T=Tc, and if T_UE is indicated in RRC, T=min(Tc, T_UE);

N: number of PFs per T;

Ns: number of POs per PF;

PF_offset: an offset of each PF;

UE_ID: fifth generation (5G)-S-temporary mobile subscriber identify (TMSI) mod 1024, where TMSI is TMSI of UE, which can be used to uniquely distinguish different UEs and will be used in message 3 (Msg3) of random access (RA). When the UE does not have TMSI, UE_ID is 0 by default.

5G-S-TMSI mentioned above is a shortened form of 5G-globally unique temporary identity (GUTI). With introduction of 5G-S-TMSI, an air-interface signaling message occupies relatively small space, thereby improving air-interface efficiency. For example, when paging, it only needs to use 5G-S-TMSI to page a mobile station.

The above parameters will be all indicated in paging control channel configuration (PCCH-Config).

After the terminal device receives on a PDCCH, via a paging-radio network temporary identifier (P-RNTI), downlink control information (DCI) format 1_0 (i.e., DCI format 1_0, which is used for scheduling a PDSCH for a cell) indication information scrambled by the P-RNTI, the terminal device knows that the network device transmits a paging message. According to time-frequency resource assignment in the DCI indication information, the terminal device decodes the paging message on the PDSCH. Upon reception of the paging message, the terminal device in an RRC_idle state detects whether a paging record information element (LE) contains a ue-Identity the same as the identity of the terminal device. If the paging record IE contains the ue-Identity the same as the identity of the terminal device, the terminal device transmits the ue-Identity and a possible access type to a higher layer, and the higher layer will instruct a media access control (MAC) layer to activate RA. The terminal device in the RRC_inactive state detects whether the paging record IE contains the ue-Identity the same as a full-RNTI stored in the terminal device. If the paging record IE contains the ud-Identity the same as the full-RNTI stored in the terminal device, the terminal device activates RRC connection recovery.

The access type indicates whether the paging message is originated due to the protocol data unit (PDU) sessions from the non-3rd generation partnership project (3GPP) access.

The paging record IE mentioned above records the following.

(1) Paging

The paging message is used for the notification of one or more UEs.

Signalling radio bearer: N/A

Radio link control-service access point (RLC-SAP): TM

Logical channel: PCCH

Direction: network to UE

Paging Message

The paging message contains at least one of:

A. pagingRecordList

B. lateNonCriticalExtension; or

C. nonCriticalExtension

The paging record contains at least one of: a UE-Identity or an access type, where the UE-Identity includes at least one of: NG-5G-S-TMSI between the access network (AN) and 5G core network (CN) or full-I-RNTI between the terminal device and the base station.

The paging record IE is as follows.

| Paging |
|---|
| The paging message is used for the notification of one or more UEs.<br>Signalling radio bearer: N/A<br>RLC-SAP: TM<br>Logical channel: PCCH<br>Direction: Network to UE |

| Paging message |
|---|

```
-- ASN1START
-- TAG-PAGING-START
Paging ::=                  SEQUENCE{
  pagingRecordList                    PagingRecordList
OPTIONAL, -- Need N
  lateNonCriticalExtension            OCTET STRING
OPTIONAL,
  nonCriticalExtension                SEQUENCE{ }
OPTIONAL
}
PagingRecordList ::=   SEQUENCE (SIZE(1..maxNrofPageRec))
                       OF PagingRecord
PagingRecord ::=            SEQUENCE {
  ue-Identity                  PagingUE-Identity,
  access Type             ENUMERATED {non3GPP}
                          OPTIONAL,   -- Need N
  ...
}
PagingUE-Identity ::=         CHOICE {
  ng-5G-S-TMSI                  NG-5G-S-TMSI,
  fullI-RNTI                    I-RNTI-Value,
  ...
}
-- TAG-PAGING-STOP
-- ASN1STOP
```

Section II: Slice Concept

A network slice is constituted by a radio access network (RAN) part and a CN part. Support of network slices by a communication network depends on that data communication belonging to different network slices (different network slices have different network slice selection assistance information (NSSAI) and different requirements for transmission performance such as reliability, a transmission delay, a transmission rate and so on) is carried by different PDU sessions.

In implementations, the network device may make enhanced mobile broadband (eMBB) services and ultra-reliable low-latency communication (URLLC) services be carried in different PDU sessions. Each of the different PDU sessions may have multiple quality of service (QoS) flows. In a certain period of time, due to the shortage of air-interface resources and other reasons, a cell may not support a slice communication service with relatively high requirements for transmission performance (such as relatively high requirements for a transmission delay). In the specific communication, in the DL direction, firstly, a service data flow (SDF) template of a network access server (NAS) layer of the CN classifies and maps different data packets from an application layer to different QoS flows of different PDU sessions, and the data packets are transmitted to the base station via different PDU sessions. The base station maps the QoS flows to different data radio bearers (DRBs) according to identifiers (IDs) of the QoS flows, and transmits the QoS flows to the terminal device via the air interface. Similarly, uplink (UL) data can also be transmitted in a similar manner, where a specific data-packet transmission is illustrated in FIG. 1.

At present, when the terminal device receives a paging message, the terminal device cannot know a type of a network slice for DL data, so that in a subsequent procedure, the terminal device cannot perform suitable operations such as accessing a cell supporting the type of the network slice for the DL data and/or accessing a network via an RA resource dedicated for the network slice. Based on an existing reselection procedure, the terminal device may be camped on a cell, where measurement of signals of the cell is relatively good but the cell cannot satisfy slice services required by the terminal device.

To solve the above problems, implementations of the present disclosure provide a paging method, where in the method, a terminal device receives, via a first P-RNTI, DCI transmitted by a network device, and acquires paging information, where the first P-RNTI corresponds to at least one network slice. According to the correspondence between P-RNTIs and network slices, a paging message corresponding to the at least one network slice can be received via the first P-RNTI, such that in a subsequent procedure, the terminal device can perform RA in an access manner suitable for the at least one network slice, and thus the terminal device can be camped on a cell that can satisfy slice services required by the terminal device.

Figure 2:
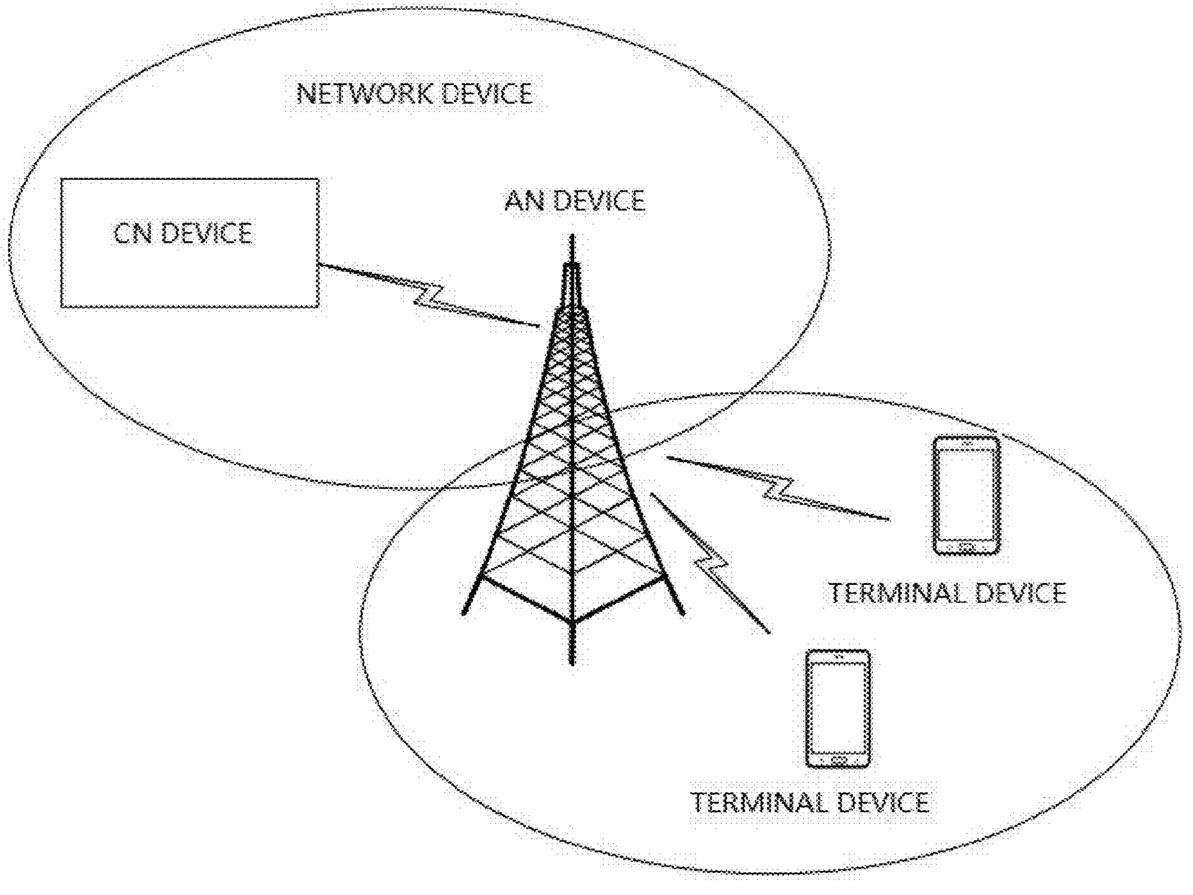
FIG. 2 is a schematic architecture diagram illustrating a communication system provided by implementations of the present disclosure.

FIG. 2 is an architecture diagram of a communication system involved in the implementations of the present disclosure. The communication system includes a network device, where the network device can communicate with terminal devices (or called communication terminals or terminals). The network device can provide communication coverage for a specified geographic area and communicate with terminal devices in the coverage area. FIG. 2 exemplarily illustrates one network device and two terminal devices. Optionally, the communication system may include multiple network devices, and in the coverage area of each network device, there may be other numbers of terminal devices, which is not limited herein. Optionally, the communication system may further include a network controller, a mobile management entity (MME), and so on, which is not limited herein.

In implementations of the present disclosure, various implementations are illustrated in combination with the network device and the terminal device. The terminal device may be referred to as a UE, an access terminal, a subscriber unit, a subscriber station, a mobile station, a remote station, a remote terminal, a mobile device, a user terminal, a terminal, a wireless communication device, a user agent, a user device, or the like.

The terminal device may be a station (ST) in a wireless local area network (WLAN), or may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in the next communication system for example new radio (NR) network, a terminal device in a future evolved public land mobile network (PLMN) or the like, which is not limited herein.

The terminal device in implementations of the present disclosure may be deployed on land, including indoor or outdoor, handheld, wearable, or vehicle-mounted; on water (e.g., a ship); and also in the air (e.g., aircraft, balloons, and satellites).

The terminal device in the implementations of the present disclosure may be a mobile phone, a pad, a computer with wireless transceiving functions, a terminal device for virtual reality (VR), a terminal device for augmented reality (AR), a wireless terminal in industrial control, a wireless terminal in self driving, a wireless terminal in remote medical, a wireless terminal in smart grid, a wireless terminal in transportation safety, a wireless terminal in smart city or smart home, or the like.

As an example but not limitation, in the implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

The network device may further include an AN device and a CN device, that is, the wireless communication system may further include multiple CNs capable of communicating with the AN device. The AN device may be an evolutional node B (eNB or e-NodeB for short), a macro base station, a micro base station (also known as "small base station"), a pico base station, an access point (AP), a transmission point (TP), or a new generation Node B (gNodeB) in a long-term evolution (LTE) system, an NR system, or an authorized auxiliary access long-term evolution (LAA-LTE) system.

In implementations of the present disclosure, the network device may be a device capable of communicating with the mobile device. The network device may be an AP in the WLAN, a base transceiver station (BTS) in the global system for mobile communications (GSM) or code division multiple access (CDMA), a NodeB (NB) in the wideband code division multiple access (WCDMA), or an eNB or eNodeB, a relay station, or an AP in the LTE, or an in-vehicle device, a wearable device, a gNB in the NR network, a network device in the future evolved PLMN, or a network device in a non-terrestrial network (NTN).

As an example but not limitation, in implementations of the disclosure, the network device may have a mobility, e.g., the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Alternatively, the network device may also be a base station deployed on land, on water, or on other locations.

In implementations of the disclosure, the network device can provide services for a cell, and the terminal device can communicate with the network device via transmission resources (e.g., frequency-domain resources or spectrum resources) for the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage ranges and low transmission power and are suitable for providing high-speed data transmission services.

It can be understood that, a device with communication functions in a network/system in implementations of the disclosure can be called a communication device. Taking the communication system illustrated in FIG. 2 as an example, communication devices may include the network device and the terminal device that have communication functions, and the network device and the terminal device may be the above-mentioned devices in the implementations of the present disclosure, which will not be repeated herein. The communication devices may further include other devices in the communication system, e.g., a network controller, an MME, or other network entities, which will not be limited in implementations of the disclosure.

The technical solutions in implementations of the present disclosure can be applicable to various communication systems, for example, the GSM, the CDMA system, the WCDMA system, a general packet radio service (GPRS) system, the LTE system, an advance LTE (LTE-A) system, the NR system, an evolution system of the NR system, an LTE-based access to unlicensed spectrum (LTE-U) system, an NR-based access to unlicensed spectrum (NR-U) system, the NTN system, a universal mobile telecommunication system (UMTS) system, the WLAN system, a wireless fidelity (WiFi) system, a fifth generation (5G) system or other communication systems.

Generally, a conventional communication system supports a limited number of connections and therefore is easy to implement. However, with development of the communication technology, the mobile communication system can not only support conventional communication, but also support, for example, device to device (D2D) communication, machine to machine (M2M) communication, machine type communication (MTC), vehicle to vehicle (V2V) communication, or vehicle to everything (V2X) communication. Implementations of the disclosure also can be applied to these communication systems.

The communication system in implementations of the disclosure can be applicable to a carrier aggregation (CA) scenario, a dual connectivity (DC) scenario, and a standalone (SA) scenario.

Figure 3:
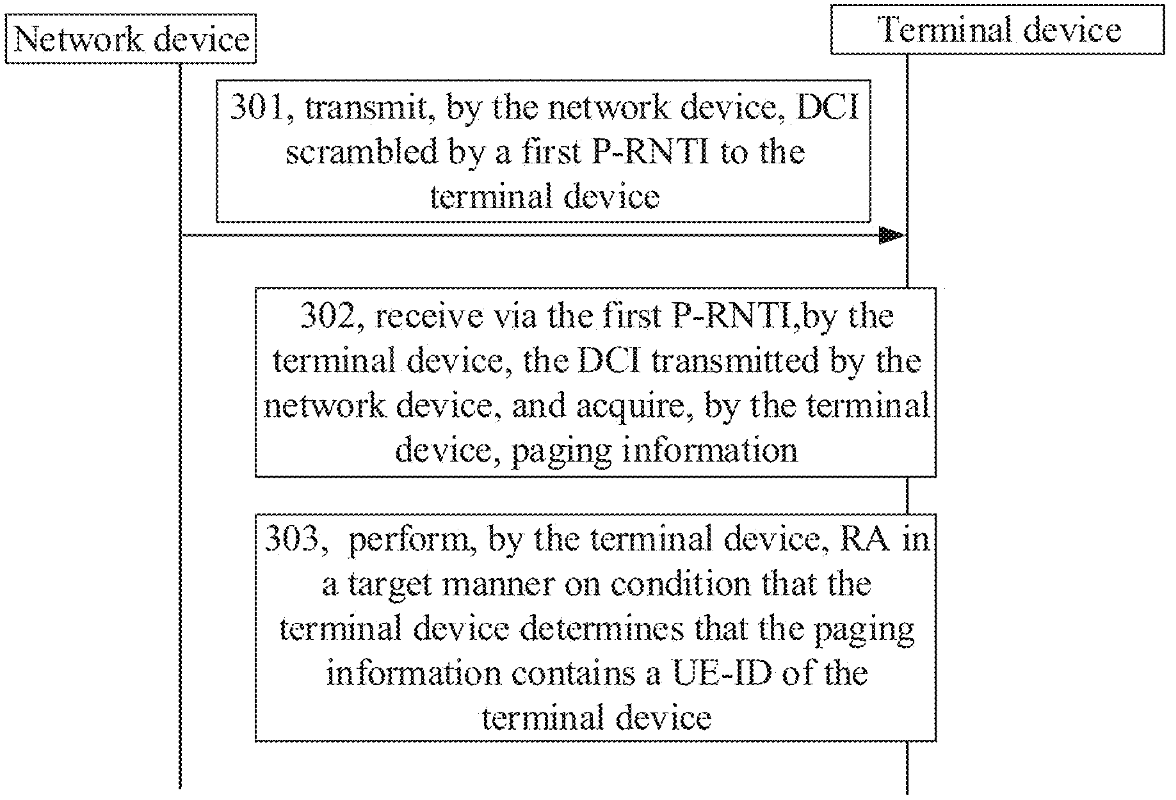
FIG. 3 is a schematic diagram illustrating a paging method provided by implementations of the present disclosure.

As illustrated in FIG. 3, implementations of the present disclosure provide a paging method. The paging method includes the following.

At 301, a network device transmits DCI scrambled by a first P-RNTI to a terminal device.

The first P-RNTI corresponds to at least network slice.

Optionally, the first P-RNTI corresponds to a first ID, where the first ID indicates the at least one network slice.

Optionally, the first ID is a number (i.e., serial number) of the at least one network slice.

Optionally, the first P-RNTI is determined according to the first ID.

Optionally, the first P-RNTI is determined according to the first ID and the following formula 3: the first P-RNTI=FFFE-ID, where the FFFE represents a fixed number in hexadecimal, and the ID represents the first ID.

Exemplarily, it is assumed that the ID is 2, then the first P-RNTI can be determined as FFFC according to the formula 3.

Optionally, the network device can configure first mapping information between different P-RNTIs and different network resources and transmit the first mapping information to the terminal device.

Correspondingly, the terminal device can receive the first mapping information.

Furthermore, the terminal device can determine the least one network slice corresponding to the first P-RNTI according to the first mapping information and the first P-RNTI.

Each network resource includes at least one network slice.

Optionally, the network device can transmit the first mapping information to the terminal device in at least one of the following manners.

Manner 1: the network device transmits to the terminal device the first mapping information via dedicated signaling. Optionally, the dedicated signaling may be radio resource control (RRC) signaling or a media access control control element (MAC CE).

Manner 2: the network device transmits to the terminal device the first mapping information via a broadcast message.

Optionally, in implementations of the present disclosure, the network device may be a CN device, or the network device may be an AN device.

(1) In an optional manner, the network device in implementations of the present disclosure is the CN device, and the network device transmits the first mapping information to the terminal device as follows. The CN device transmits to the AN device the first mapping information via an NG message, and then the AN device transmits the first mapping information to the terminal device.

The NG message is a message transmitted via an NG interface, where the NG interface is a logical interface between the radio access network and the CN.

(2) In another optional manner, the network device in implementations of the present disclosure is the AN device, and the network device transmits the first mapping information to the terminal device as follows. The AN device can directly transmit the first mapping information to the terminal device.

Optionally, the network device can number different network slices supported by the network device and transmit target mapping information to the terminal device.

The target mapping information is mapping information between different network slices and different numbers, where each number corresponds to at least one network slice.

Correspondingly, the terminal device can receive the target mapping information transmitted by the network device, where the target mapping information is mapping information between different network slices and different numbers.

Optionally, the network device can transmit the target mapping information to the terminal device in at least one of the following manners.

Manner 1: the network device transmits the target mapping information to the terminal device via dedicated signaling. Optionally, the dedicated signaling may be RRC signaling or an MAC CE.

Manner 2: the network device transmits the target mapping information to the terminal device via a broadcast message.

Optionally, a message used for the network device to transmit the first mapping information to the terminal device is the same as that used for the network device to transmit the target mapping information to the terminal device.

Optionally, a message used for the network device to transmit the first mapping information to the terminal device is different from that used for the network device to transmit the target mapping information to the terminal device.

Optionally, the target mapping information includes second mapping information or third mapping information, where the second mapping information is mapping information between slice IDs of different network slices and different numbers, or the third mapping information is mapping information between different slice groups and different numbers, where each slice group includes multiple network slices.

(1) In an optional manner, the network device in implementations of the present disclosure is the CN device, and the network device transmits the target mapping information to the terminal device as follows. The CN device transmits to the AN device the target mapping information via an NG message, and then the AN device transmits the target mapping information to the terminal device.

(2) In another optional manner, the network device in implementations of the present disclosure is the AN device, and the network device transmits the target mapping information to the terminal device as follows. The AN device can directly transmit the target mapping information to the terminal device.

Optionally, there may be two possible cases for the first ID.

Case 1: the first ID is a first target number corresponding to at least one slice ID of the at least one network slice.

Optionally, a slice ID may be an S-NSSAI ID.

In the case where a slice ID is an S-NSSAI ID, the first ID is a first target number corresponding to at least one S-NSSAI ID of the at least one network slice.

Optionally, the network device numbers slice IDs of different network slices supported by the network device and transmits the second mapping information to the terminal device.

Optionally, the second mapping information is mapping information between slice IDs of different network slices and different numbers.

Optionally, the network device can number, in a first order, slice IDs of different network slices supported by the network device.

Optionally, the first order may be any one of the following: (a) a descending order of slice IDs; (b) an ascending order of slice IDs; (c) an order of slice IDs in a slice ID list.

Optionally, a slice ID may be an S-NSSAI ID, and a slice ID list may be an S-NSSAI ID list.

Optionally, the network device can number, in the first order, slice IDs of different network slices supported by the network device as follows.

In a possible implementation, the network device numbers slice IDs of different network slices supported by the network device in the descending order of slice IDs, for example, from the largest slice ID to the $n^{th}$ slice ID, slice IDs can be numbered as 1, 2, 3, . . . n.

In another possible implementation, the network device numbers slice LDs of different network slices supported by the network device in the ascending order of slice IDs, for example, from the minimum slice ID to the $n^{th}$ slice ID, slice IDs can be numbered as 1, 2, 3, . . . n.

In yet another implementation, the network device numbers slice IDs of different network slices supported by the network device in the order of slice IDs in the slice ID list.

Exemplarily, it is assumed that slice IDs supported by the network device includes slice ID-A, slice ID-B, and slice ID-C. The order of slice IDs in the slice ID list is slice ID-B to slice ID-C to slice ID-A, and then slice ID-B can be numbered as 1, slice ID-C can be numbered as 2, and slice ID-A can be numbered as 3.

Case 2: the first ID is a second target number corresponding to a slice group including the at least one network slice.

Optionally, the network device groups different network slices supported by the network device, assigns different numbers for different slice groups, and transmits the third mapping information to the terminal device.

Each slice group include multiple network slices, and the third mapping information is mapping information between different slice groups and different numbers.

Exemplarily, it is assumed that the network device supports network slice A, network slice B, network slice C, network slice D, and network slice F, then network slice A, network slice B, and network slice C can be grouped into one group and the slice group is numbered as 1, and network slice D and network slice E can be grouped into one group and the slice group is numbered as 2.

At 302, the terminal device receives, via the first P-RNTI, the DCI transmitted by the network device, and acquires paging information.

Optionally, "the terminal device receives, via the first P-RNTI, the DCI transmitted by the network device, and acquires the paging information" can be implemented by operations at 3021 and 3022.

3021, the terminal device receives, on a target time-domain location, DCI format 1_0 scrambled by the first P-RNTI.

Optionally, the target time-domain location is determined by a PF and a PO.

At 3022, the terminal device receives the paging information on a PDSCH according to a time-frequency resource assignment in the DCI format 1_0.

Optionally, the DCI format 1_0 with cyclic redundancy check (CRC) and scrambled by the P-RNTI can carry the following information: (1) frequency domain resource assignment; (2) time domain resource assignment.

The terminal device can receive the paging information on the PDSCH according to the time domain resource assignment.

Optionally, the terminal device can receive the first mapping information transmitted by the network device, where the first mapping information is mapping information between different P-RNTIs and different network sources. Each network resource includes at least one network slice.

Further, after the terminal device receives the first mapping information transmitted by the network device, the terminal device can further determine at least one network slice corresponding to the first P-RNTI according to the first mapping information.

Optionally, the terminal device can further receive the target mapping information transmitted by the network device, where the target mapping information is mapping information between different network slices and different numbers.

Optionally, the target mapping information includes the second mapping information or the third mapping information, where the second mapping information is mapping information between slice IDs of different network slices and different numbers, or the third mapping information is mapping information between different slice groups and different numbers, and each slice group includes multiple network slices.

The paging method provided in implementations of the present disclosure further includes an operation at 303.

At 303, the terminal device performs RA in a target manner on condition that the terminal device determines that the paging information contains a UE-ID of the terminal device.

Optionally, upon acquiring the paging information, the terminal device can detect whether the paging information contains the UE-ID of the terminal device. If the paging information contains the UE-ID of the terminal device, the terminal device performs RA in the target manner.

The target manner is determined according to the at least one network slice.

Optionally, if the paging information contains the UE-ID of the terminal device, the terminal device performs RA in the target manner as follows. The terminal device decodes the paging information, and performs RA in the target manner if at least one paging message is acquired by decoding the paging information and the at least one paging message contains a UE-ID the same as the UE-ID of the terminal device.

Optionally, "the terminal device performs RA in the target manner" includes the following possible implementation manners.

Manner A: the terminal device accesses a cell supporting the at least one network slice.

Manner B: the terminal device accesses a cell supporting a target network slice, where the target network slice is n network slice with the highest priority in the at least one network slice, where n is an integer larger than or equal to 1.

Manner C: the terminal device performs RA via an access resource corresponding to the at least one network slice.

Manner D: the terminal device performs RA via an access resource corresponding to the target network slice.

Manner E: the terminal device accesses the cell supporting the at least one network slice via the access resource corresponding to the at least one network slice.

Manner F: the terminal device accesses the cell supporting the target network slice via the access resource corresponding to the target network slice.

It is to be noted that in implementations of the present disclosure, manner A to manner F are exemplary illustrations, and besides the above six RA manners, other access manners can also be included, which is not limited in implementations of the present disclosure.

Optionally, the above access resource may include the following cases.

Case 1: RA preamble.

Case 2: RA time-frequency resource.

Case 3: RA preamble and RA time-frequency resource.

The paging method is provided in implementations of the present disclosure, where in the method, the terminal device receives, via the first P-RNTI, the DCI transmitted by the network device and acquires the paging information. The first P-RNTI corresponds to the at least one network slice. According to the correspondence between P-RNTIs and network slices, the terminal device can receive the paging message corresponding to the at least one network slice via the first P-RNTI. As such, in the subsequent procedure, the terminal device can perform RA in an access manner suitable for the at least one network slice, and thus the terminal device can be camped on a cell that can satisfy slice services required by the terminal device.

Figure 4:
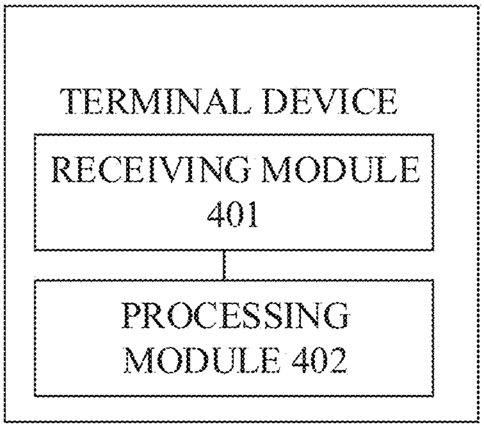
FIG. 4 is a schematic structural diagram illustrating a terminal device provided by implementations of the present disclosure.

As illustrated in FIG. 4, implementations of the present disclosure provide a terminal device. The terminal device includes a receiving module 401 configured to receive, via a first P-RNTI, DCI transmitted by a network device and acquire paging information, where the first P-RNTI corresponds to at least network slice.

Optionally, "the first P-RNTI corresponds to the at least one network slice" includes that the first P-RNTI corresponds to a first ID, where the first ID indicates the at least one network slice.

Optionally, the first ID is a first target number corresponding to at least one slice ID of the at least one network slice, or the first ID is a second target number corresponding to a slice group including the at least one network slice.

Optionally, the first P-RNTI is determined according to the first ID.

Optionally, "the first P-RNTI is determined according to the first ID" includes that the first P-RNTI=FFFE-ID, where the FFFE represents a fixed number in hexadecimal, and the ID represents the first ID.

Optionally, the receiving module 401 is configured to receive, on a target time-domain location, DCI format 1_0 scrambled by the first P-RNTI, and receive, on a PDSCH, the paging information according to time-frequency resource assignment in the DCI format 1_0.

Optionally, the target time-domain location is determined according to a PF and a PO.

Optionally, the receiving module 401 is further configured to receive first mapping information transmitted by the network device, where the first mapping information is mapping information between different P-RNTIs and different network resources, and each of the network resources includes at least one network slice.

Optionally, the terminal device further includes a processing module 402 configured to determine the least one network slice corresponding to the first P-RNTI according to the first mapping information, after the receiving module 401 receives the first mapping information transmitted by the network device.

Optionally, the receiving module 401 is further configured to receive target mapping information transmitted by the network device, where the target mapping information is mapping information between different network slices and different numbers.

Optionally, the target mapping information includes second mapping information or third mapping information, where the second mapping information is mapping information between slice IDs of different network slices and different numbers, or the third mapping information is mapping information between different slice groups and different numbers, where each slice group includes multiple network slices.

Optionally, a slice ID is an S-NSSAI ID.

Optionally, the terminal device further includes the processing module 402 configured to perform RA in a target manner on condition that the paging information contains a UE-ID of the terminal device, after the receiving module 401 acquires the paging information, where the target manner is determined according to the at least one network slice.

Optionally, the processing module 402 is configured to access a cell supporting the at least one network slice, or access a cell supporting a target network slice, where the target network slice includes n network slice with the highest priority among the at least one network slice, where n is an integer larger than or equal to 1.

Optionally, the processing module 402 is configured to perform RA via an access resource corresponding to the at least one network slice, or perform RA via an access resource corresponding to a target network slice, where the target network slice includes n network slice with the highest priority among the at least one network slice, and n is an integer larger than or equal to 1.

Optionally, the access resource includes an RA preamble and/or an RA time-frequency resource.

Optionally, the processing module 402 is configured to decode the paging information, and perform RA in the target manner on condition that at least one paging message is acquired by decoding the paging information and the at least one paging message contains a UE-ID in consistent with a UE-ID of the terminal device.

Figure 5:
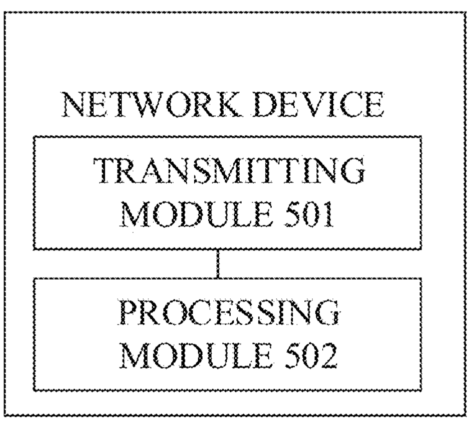
FIG. 5 is a schematic structural diagram illustrating a network device provided by implementations of the present disclosure.

As illustrated in FIG. 5, implementations of the present disclosure further provide a network device. The network device includes a transmitting module 501 configured to transmit DCI scrambled by a first P-RNTI to a terminal device, where the first P-RNTI corresponds to at least one network slice.

Optionally, "the first P-RNTI corresponds to the at least one network slice" includes that the first P-RNTI corresponds to a first ID, where the first ID indicates the at least one network slice.

Optionally, the first ID is a first target number corresponding to at least one slice ID of the at least one network slice, or the first ID is a second target number corresponding to a slice group including the at least one network slice.

Optionally, the first P-RNTI is determined according to the first ID.

Optionally, "the first P-RNTI is determined according to the first ID" includes that the first P-RNTI=FFFE-ID, where the FFFE represents a fixed number in hexadecimal, and the ID represents the first ID.

Optionally, the transmitting module 501 is configured to transmit to the terminal device DCI format 1_0 scrambled by the first P-RNTI, where the DCI format 1_0 contains time-frequency resource assignment.

Optionally, the network device further incudes a processing module 502 configured to configure first mapping information between different P-RNTIs and different network resources, where each network resource includes at least one network slice. The transmitting module 501 is configured to transmit the first mapping information to the terminal device.

Optionally, the network device further includes the processing module 502 configured to number different network slices supported by the network device. The transmitting module 501 is configured to transmit the target mapping information to the terminal device. The target mapping information is mapping information between different network slices and different numbers, where each number corresponds to at least one network slice.

Optionally, the processing module 502 is further configured to number slice LDs of different network slices supported by the network device. The transmitting module 501 is further configured to transmit second mapping information to the terminal device, where the second mapping information is mapping information between slice IDs of different network slices and different numbers.

Optionally, the processing module 502 is configured to number, in a first order, the slice IDs of different network slices supported by the network device, where the first order is one of the following: a descending order of the slice IDs, an ascending order of the slice IDs, and the order of the slice IDs in the slice ID list.

Optionally, a slice ID is an S-NSSAI ID.

Optionally, the processing module 502 is configured to group different network slices supported by the network device and configure different numbers for different slice groups. The transmitting module 501 is further configured to transmit third mapping information to the terminal device. Each slice group include multiple network slices, or the third mapping information is mapping information between different slice groups and different numbers.

Optionally, the network device is a CN device. The transmitting module 501 is configured to transmit the target mapping information to an AN device via an NG message, and then the AN device transmits the target mapping information to the terminal device.

Implementations of the present disclosure further provides a terminal device. The terminal device includes a memory storing an executable program code and a processor coupled with the memory, where the processor is configured to invoke the executable program code in the memory to perform the paging method performed by the terminal device in the implementations of the present disclosure.

Implementations of the present disclosure further provides a network device. The network device includes a memory storing an executable program code and a processor coupled with the memory, where the processor is configured to invoke the executable program code in the memory to perform the paging method performed by the network device in the implementations of the present disclosure.

Figure 6:
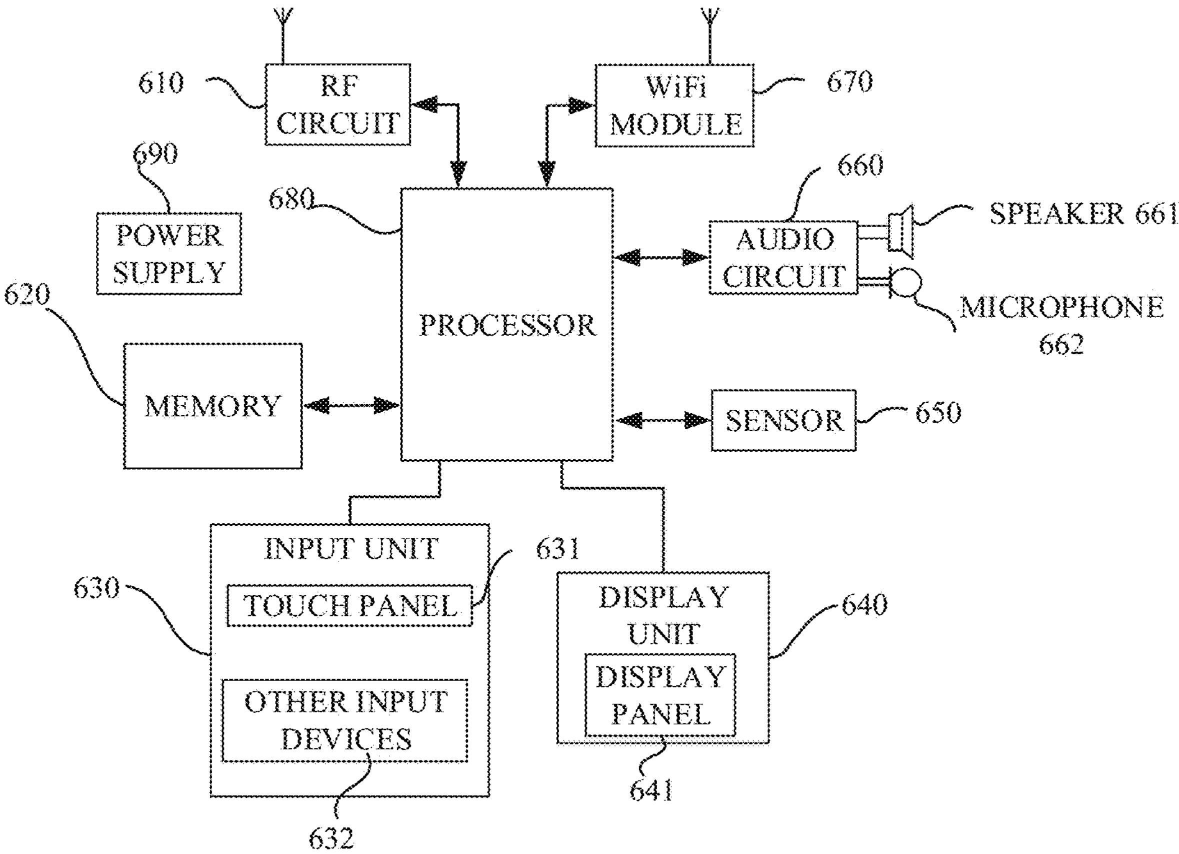
FIG. 6 is a schematic structural diagram illustrating a mobile phone provided by implementations of the present disclosure.

Exemplarily, the terminal device in the implementations of the present disclosure may be a mobile phone. As illustrated in FIG. 6, the mobile phone may include a radio frequency (RF) circuit 610, a memory 620, an input unit 630, a display unit 640, a sensor 650, an audio circuit 660, a wireless fidelity (Wi-Fi) module 670, a processor 680, a power supply 690, and the like. The RF circuit 610 includes a receiver (not illustrated) and a transmitter (not illustrated). Those skilled in the art can understand that the structure of the mobile phone illustrated in FIG. 6 does not constitute any limitation on a mobile phone. The mobile phone may include more or fewer components than illustrated or have different component arrangement, or certain components illustrated may be combined.

The RF circuit 610 is configured to transmit or receive information, or transmit or receive signals during a phone call. Particularly, after receiving downlink information from a base station, the RF circuit 610 can transmit the downlink information to the processor 680 for processing. The RF circuit 910 can also transmit uplink data to the base station. Generally, the RF circuit 610 includes but is not limited to an antenna, at least one amplifier, a transceiver, a coupler, a low noise amplifier (LNA), a duplexer, and the like. In addition, the RF circuit 610 may also communicate with the network and other devices via wireless communication. The above wireless communication may use any communication standard or protocol, which includes but is not limited to GSM, GPRS, CDMA, WCDMA, LTE, E-mail, short messaging service (SMS), and so on.

The memory 620 is configured to store software programs and modules, and the processor 680 is configured to execute various function applications and data processing of the mobile phone by running the software programs and the modules stored in the memory 620. The memory 620 mainly includes a program storage area and a data storage area. The program storage area may store an operating system, application programs required for at least one function (such as a sound playback application, an image playback application, etc.), and so on. The data storage area may store data (such as audio data, contact list, etc.) created according to use of the mobile phone, and so on. In addition, the memory 920 may include a high-speed random access memory (RAM), and may further include a non-volatile memory such as at least one disk storage device, a flash device, or other non-volatile solid storage devices.

The input unit 630 may be configured to receive input digital or character information and generate key signal input associated with user setting and function control of the mobile phone. As one example, the input unit 630 may include a touch panel 631 and other input devices 632. The touch panel 631, also referred to as a touch screen, can collect touch operations of the user on or near the touch panel 631 (for example, touch operations of the user on the touch panel 631 or near the touch panel 631 with a finger, a stylus, or the like) and drive a corresponding device connected to the touch panel 631 according to a preset program. Optionally, the touch panel 631 can include a touch detection device and a touch controller. The touch detection device detects the touch orientation of the user, detects a signal generated due to the touch operation, and transmits the signal to the touch controller. The touch controller receives the touch information from the touch detection device, converts the touch information into contact coordinates, and sends the touch information to the processor 680. The touch controller can also receive and execute commands from the processor 680. In addition, the touch panel 631 can be implemented in various types such as resistive, capacitive, infrared, and surface acoustic waves. In addition to the touch panel 631, the input unit 630 may further include other input devices 632. As one example, the other input devices 632 may include, but are not limit to, one or more of a physical key, a function key (such as a volume control key, a switch key, etc.), and the like.

The display unit 640 is configured to display information input by the user or information provided for the user and various menus of the mobile phone. The display unit 640 may include a display panel 641. In an example, the display panel 641 may be in the form of a liquid crystal display (LCD), an organic light-emitting diode (OLED), and so on. In an example, the touch panel 631 can cover the display panel 641. When the touch panel 631 detects a touch operation on or near the touch panel 631, the touch panel 631 transmits the touch operation to the processor 980 to determine the type of touch event. Then the processor 680 provides, according to the type of touch event, a corresponding visual output on the display panel 641. Although the touch panel 631 and the display panel 641 are illustrated as two separate components in FIG. 6 to realize the input and output functions of the mobile phone, in some examples, the touch panel 631 and the display panel 641 may be integrated to implement the input and output functions of the mobile phone.

The mobile phone may further include at least one sensor 650, such as a light sensor, a motion sensor, and other sensors. As one example, the light sensor may include an ambient light sensor and a proximity sensor, where the ambient light sensor may adjust the brightness of the display panel 641 according to ambient lights, and the proximity sensor may turn off the display panel 641 and/or backlight when the mobile phone reaches near the ear. As a kind of motion sensor, the accelerometer sensor can detect the magnitude of acceleration in all directions and when the mobile phone is stationary, the accelerometer sensor can detect the magnitude and direction of gravity. The accelerometer sensor can also identify mobile-phone gestures related applications (such as vertical and horizontal screen switch, related games, magnetometer orientation calibration), or the accelerometer sensor can be used for vibration-recognition related functions (such as a pedometer, percussion), and so on. The mobile phone can further be equipped with a gyro-sensor, an atmospheric pressure sensor, a humidity sensor, a temperature sensor, an infrared sensor, and other sensors.

The audio circuit 660, a speaker 661, a microphone 662 may provide an audio interface between the user and the mobile phone. The audio circuit 660 may convert received audio data into electrical signals and transmit the electrical signals to the speaker 661. The speaker 661 converts the electrical signals into sound signals for output. On the other hand, the microphone 662 converts received sound signals into electrical signals, which will be received and converted into audio data by the audio circuit 660 for output. The audio data is then processed by the processor 680 and transmitted via the RF circuit 610 to another mobile phone, or the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media, and the like. Wi-Fi provides users with wireless broadband Internet access. Although the Wi-Fi module 670 is illustrated in FIG. 6, it can be understood that the Wi-Fi module 670 is not essential to the mobile phone and can be omitted according to actual needs without changing the scope of the present disclosure.

The processor 680 is the control center of the mobile phone and is configured to connect various parts of the whole mobile phone through various interfaces and lines. The processor 680 runs or executes software programs and/or modules stored in the memory 620 and invokes data stored in the memory 620 to perform various functions of the mobile phone and process data, thereby monitoring the mobile phone as a whole. In an example, the processor 680 may include one or more processing units. In an example, the processor 680 may integrate an application processor and a modem processor, where the application processor is configured to handle an operating system, a user interface, an application, and so on, and the modem processor is mainly configured to process wireless communication. It is to be understood that the modem processor herein may not be integrated into the processor 680.

The mobile phone 600 further includes the power supply 690 (e.g., a battery) that supplies power to various components. Preferably, the power supply 690 may be logically connected to the processor 680 via a power management system to enable management of charging, discharging, and power consumption through the power management system. Although not illustrated, the mobile phone may further include a camera, a Bluetooth module and so on, which will not be repeated herein.

In implementations of the present disclosure, the RF circuit 610 is configured to receive, via a first P-RNTI, DCI transmitted by the network device and acquire paging information, where the first P-RNTI corresponds to at least network slice.

Optionally, "the first P-RNTI corresponds to the at least one network slice" includes that the first P-RNTI corresponds to a first ID, where the first ID indicates the at least one network slice.

Optionally, the first ID is a first target number corresponding to at least one slice ID of the at least one network slice, or the first ID is a second target number corresponding to a slice group including the at least one network slice.

Optionally, the first P-RNTI is determined according to the first ID.

Optionally, "the first P-RNTI is determined according to the first ID" includes that the first P-RNTI=FFFE-ID, where the FFFE represents a fixed number in hexadecimal, and the ID represents the first ID.

Optionally, the RF circuit 610 is configured to receive, on a target time-domain location, DCI format 1_0 scrambled by the first P-RNTI, and receive, on a PDSCH, the paging information according to time-frequency resource assignment in the DCI format 1_0.

Optionally, the target time-domain location is determined according to a PF and a PO.

Optionally, the RF circuit 610 is further configured to receive first mapping information transmitted by the network device, where the first mapping information is first mapping information between different P-RNTIs and different network resources, and each of the network resources includes at least one network slice.

Optionally, the mobile phone further includes the processor 680 configured to determine the least one network slice corresponding to the first P-RNTI according to the first mapping information, after the RF circuit 610 receives the first mapping information transmitted by the network device.

Optionally, the RF circuit 610 is further configured to receive target mapping information transmitted by the network device, where the target mapping information is mapping information between different network slices and different numbers.

Optionally, the target mapping information includes second mapping information or third mapping information, where the second mapping information is mapping information between slice IDs of different network slices and different numbers, or the third mapping information is mapping information between different slice groups and different numbers, where each slice group includes multiple network slices.

Optionally, the slice ID is an S-NSSAI ID.

Optionally, the mobile phone further includes the processor 680 configured to perform RA in a target manner on condition that the paging information contains a UE-ID of the terminal device, after the RF circuit 610 acquires the paging information, where the target manner is determined according to the at least one network slice.

Optionally, the processor 680 is configured to access a cell supporting the at least one network slice, or access a cell supporting at least one target network slice, where the at least one target network slice includes n network slice with the highest priority among the at least one network slice, wherein n is an integer larger than or equal to 1.

Optionally, the processor 680 is configured to perform RA via an access resource corresponding to the at least one network slice, or perform RA via an access resource corresponding to a target network slice, where the target network slice includes n network slice with the highest priority among the at least one network slice, and n is an integer larger than or equal to 1.

Optionally, the access resource includes an RA preamble and/or an RA time-frequency resource.

Optionally, the processor 680 is configured to decode the paging information, and perform RA in the target manner on condition that at least one paging message is acquired by decoding the paging information and the at least one paging message contains a UE-ID in consistent with a UE-ID of the terminal device.

Figure 7:
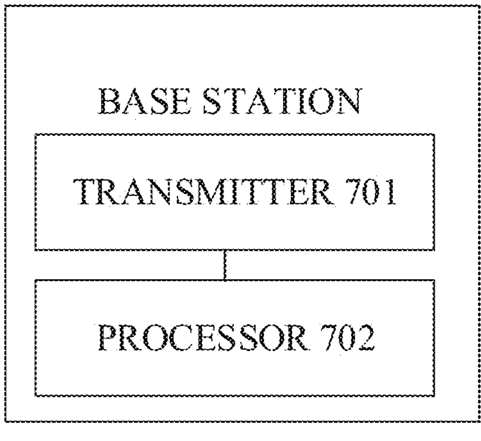
FIG. 7 is a schematic structural diagram illustrating a base station provided by implementations of the present disclosure.

Exemplarily, as illustrated in FIG. 7, the network device in implementations of the present disclosure may be a base station. The base station includes a transmitter 701 configured to transmit DCI scrambled by a first P-RNTI, where the first P-RNTI corresponds to at least one network slice.

Optionally, "the first P-RNTI corresponds to the at least one network slice" includes that the first P-RNTI corresponds to a first ID, where the first ID indicates the at least one network slice.

Optionally, the first ID is a first target number corresponding to at least one slice ID of the at least one network slice, or the first ID is a second target number corresponding to a slice group including the at least one network slice.

Optionally, the first P-RNTI is determined according to the first ID.

Optionally, "the first P-RNTI is determined according to the first ID" includes that the first P-RNTI=FFFE-ID, where the FFFE represents a fixed number in hexadecimal, and the ID represents the first ID.

Optionally, the transmitter 701 is configured to transmit to the terminal device DCI format 1_0 scrambled by the first P-RNTI, where the DCI format 1_0 contains time-frequency resource assignment.

Optionally, the network device further incudes a processor 702 configured to configure first mapping information between different P-RNTIs and different network resources, where each network resource includes at least one network slice. The transmitter 701 is further configured to transmit the first mapping information to the terminal device.

Optionally, the processor 702 is further configured to number different network slices supported by the network device. The transmitter 701 is configured to transmit target mapping information to the terminal device.

The target mapping information is mapping information between different network slices and different numbers, where each number corresponds to at least one network slice.

Optionally, the processor 702 is further configured to number slice LDs of different network slices supported by the network device.

The transmitter 701 is further configured to transmit second mapping information to the terminal device, where the second mapping information is mapping information between the slice IDs of different network slices and different numbers.

Optionally, the processor 702 is configured to number, in a first order, the slice IDs of different network slices supported by the network device, where the first order is one of the following: a descending order of the slice IDs, an ascending order of the slice IDs, and the order of the slice IDs in the slice ID list.

Optionally, a slice ID is an S-NSSAI ID.

Optionally, the processor 702 is configured to group different network slices supported by the network device and configure different numbers for different slice groups. The transmitter 701 is further configured to transmit third mapping information to the terminal device. Each slice group include multiple network slices, and the third mapping information is mapping information between different slice groups and different numbers.

Optionally, the network device is a CN device. The transmitter 701 is configured to transmit the target mapping information to an AN device via an NG message, and then the AN device transmits the target mapping information to the terminal device.

Implementations of the present disclosure further provide a computer-readable storage medium including computer instructions which, when run on a computer, enables the computer to perform various operations performed by the terminal device in the above method implementation.

Implementations of the present disclosure further provide a computer-readable storage medium including computer instructions which, when run on a computer, enables the computer to perform various operations performed by the network device in the above method implementation.

Implementations of the present disclosure further provide a computer program product including computer instructions, where when the computer program product is run on a computer, the computer runs the computer instructions to enable the computer to perform various operations performed by the terminal device in the above method implementation.

Implementations of the present disclosure further provide a computer program product including computer instructions, where when the computer program product is run on a computer, the computer runs the computer instructions to enable the computer to perform various operations performed by the network device in the above method implementation.

Implementations of the present disclosure further provide a chip. The chip is coupled with a memory in a terminal device. The chip, when running, invokes program instructions in the memory, to enable the terminal device to perform various operations performed by the terminal device in the above method implementation.

Implementations of the present disclosure further provide a chip. The chip is coupled with a memory in a network device. The chip, when running, invokes program instructions in the memory, to enable the network device to perform various operations performed by the network device in the above method implementation.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The terms "first", "second", "third", "fourth", and the like (if exist) used in the specification, the claims, and the accompany drawings of the present disclosure are used to distinguish similar objects rather than describe a particular order. It is to be understood that the terms so used are interchangeable under appropriate circumstances such that the implementations described herein can be practiced in orders other than those illustrated or described herein. In addition, the terms "include", "comprise", and "have" as well as variations thereof are intended to cover non-exclusive inclusion, for example, a process, method, system, product or device including a series of steps or units is not necessarily limited to those steps or units explicitly listed, but may include other steps or units not explicitly listed or other steps or units inherent to the process, method, product or device.

What is claimed is:

1. A paging method comprising:

receiving via a first paging-radio network temporary identifier (P-RNTI), by a terminal device, downlink control information (DCI) transmitted by a network device, and acquiring, by the terminal device, paging information based on the DCI, the first P-RNTI corresponding to at least one network slice;

performing, by the terminal device, random access (RA) in a target manner on condition that the paging information contains a user-equipment (UE)-identifier (ID) of the terminal device, wherein the target manner is determined according to the at least one network slice;

wherein performing, by the terminal device, the RA in the target manner comprises:

accessing, by the terminal device, a cell supporting a target network slice, wherein the target network slice comprises n network slice with a highest priority among the at least one network slice, wherein n is an integer larger than or equal to 1.

2. The method of claim 1, wherein the first P-RNTI corresponding to the at least one network slice comprises:

the first P-RNTI corresponding to a first identifier (ID), wherein the first ID indicates the at least one network slice.

3. The method of claim 2, wherein:

the first ID is a first target number corresponding to at least one slice ID of the at least one network slice; or the first ID is a second target number corresponding to a slice group comprising the at least one network slice.

4. The method of claim 3, wherein the first P-RNTI is determined according to the first ID;

wherein the first P-RNTI=FFFE-ID, wherein the FFFE represents a fixed number in hexadecimal, and the ID represents the first ID.

5. The method of claim 1, wherein receiving via the first P-RNTI, by the terminal device, the DCI transmitted by the network device, and acquiring, by the terminal device, the paging information, comprises:

receiving, by the terminal device, DCI format 1_0 scrambled by the first P-RNTI; and receiving on a physical downlink shared channel (PDSCH), by the terminal device, the paging information according to time-frequency resource assignment in the DCI format 1_0.

6. The method of claim 1, further comprising:

receiving, by the terminal device, first mapping information transmitted by the network device, wherein the first mapping information is mapping information between different P-RNTIs and different network resources, wherein each of the network resources comprises at least one network slice; and determining, by the terminal device, the least one network slice corresponding to the first P-RNTI according to the first mapping information.

7. The method of claim 1, further comprising:
receiving, by the terminal device, target mapping information transmitted by the network device, wherein the target mapping information is mapping information between different network slices and different numbers.

8. The method of claim 7, wherein the target mapping information comprises second mapping information or third mapping information; and
wherein one of the following:
the second mapping information is mapping information between slice IDs of the different network slices and different numbers; and
the third mapping information is mapping information between different slice groups and different numbers, wherein each slice group comprises a plurality of network slices.

9. A terminal device comprising:
a receiver configured to receive, via a first paging-radio network temporary identifier (P-RNTI), downlink control information (DCI) transmitted by a network device, and acquire paging information based on the DCI, the first P-RNTI corresponding to at least one network slice; and
a processor configured to perform random access (RA) in a target manner on condition that the paging information contains a user-equipment (UE)-identifier (ID) of the terminal device, wherein the target manner is determined according to the at least one network slice;
wherein the processor configured to perform RA in the target manner is configured to access a cell supporting a target network slice, wherein the target network slice comprises n network slice with a highest priority among the at least one network slice, wherein n is an integer larger than or equal to 1.

10. The terminal device of claim 9, wherein the processor is configured to:
perform RA via an access resource corresponding to the target network slice.

11. A network device comprising:
a transmitter configured to transmit downlink control information (DCI) scrambled by a first paging-radio network temporary identifier (P-RNTI) to a terminal device, the first P-RNTI corresponding to at least one network slice;
wherein the DCI is used by the terminal device to acquire paging information; on condition that the paging information contains a user-equipment (UE)-identifier (ID) of the terminal device, the paging information causes the terminal device to perform RA in a target manner, wherein the target manner refers to accessing a cell supporting a target network slice, wherein the target network slice comprises n network slice with a highest priority among the at least one network slice, wherein n is an integer larger than or equal to 1.

12. The network device of claim 11, further comprising:
a processor configured to configure first mapping information between different P-RNTIs and different network resources, wherein each of the network resources comprises at least one network slice; and
the transmitter is further configured to transmit the first mapping information to the terminal device.

13. The network device of claim 11, further comprising:
a processor configured to number different network slices supported by the network device;
wherein the transmitter is configured to transmit target mapping information to the terminal device;
wherein the target mapping information is mapping information between different network slices and different numbers, and each number corresponds to at least one network slice.

14. The network device of claim 13, wherein:
the processor is configured to number slice identifiers (IDs) of the different network slices supported by the network device;
the transmitter is configured to transmit second mapping information to the terminal device;
the second mapping information is mapping information between the slice IDs of the different network slices and different numbers.

15. The network device of claim 14, wherein the processor is configured to number the slice IDs of the different network slices supported by the network device in a first order, wherein the first order is one of:
a descending order of the slice IDs, an ascending order of the slice IDs, an order of the slice IDs in the slice ID.

16. The network device of claim 13, wherein:
the processor is configured to group the different network slices supported by the network device, and configure different numbers for different slice groups;
the transmitter is further configured to transmit third mapping information to the terminal device;
each slice group comprises a plurality of network slices, and the third mapping information is mapping information between the different slice groups and the different numbers.

17. The network device of claim 13, wherein the network device is a core network (CN) device, and the transmitter is configured to transmit the target mapping information to an access network (AN) device via an NG message, wherein the target mapping information is transmitted to the terminal device by the AN device.

* * * * *